July 18, 1967 T. P. LARGEY 3,331,926

AUTOMATIC TELEPHONE SYSTEM HAVING RESTRICTED SERVICE MEANS

Filed July 9, 1964 2 Sheets-Sheet 1

INVENTOR,
THOMAS P. LARGEY.
BY: Harry M. Saragovitz, Edward J. Kelly, Herbert Berl & Julian C. Keppler ATTORNEYS.

AUTOMATIC TELEPHONE SYSTEM HAVING RESTRICTED SERVICE MEANS

Filed July 9, 1964 2 Sheets-Sheet 2

INVENTOR,
THOMAS P. LARGEY.

BY: Harry M. Saragovitz,
Edward J. Kelly,
Herbert Berl &
Julian C. Keppler
ATTORNEYS.

United States Patent Office 3,331,926

Patented July 18, 1967

3,331,926

AUTOMATIC TELEPHONE SYSTEM HAVING RESTRICTED SERVICE MEANS

Thomas P. Largey, 129 Ocean Ave., East Keansburg, N.J. 07734

Filed July 9, 1964, Ser. No. 381,595
3 Claims. (Cl. 179—18)

ABSTRACT OF THE DISCLOSURE

The private automatic telephone system includes outgoing trunk lines for connecting the PABX to central offices. A restrictor is located at the PABX to determine the destination of an outgoing call so that attempts to call outside the unrestricted area may be blocked. An adapter detects when an outgoing call is being initiated and energizes the restrictor. The restrictor which utilizes a stepping relay finds the outgoing trunk. A tester in the restrictor detects the dialing pulses. If the call is to the unrestricted area then the tester simply releases the restrictor from the trunk. However, if a restricted call is initiated the tester will disconnect the outgoing trunk from the central office and disconnect the register from the trunk.

Figure 1:
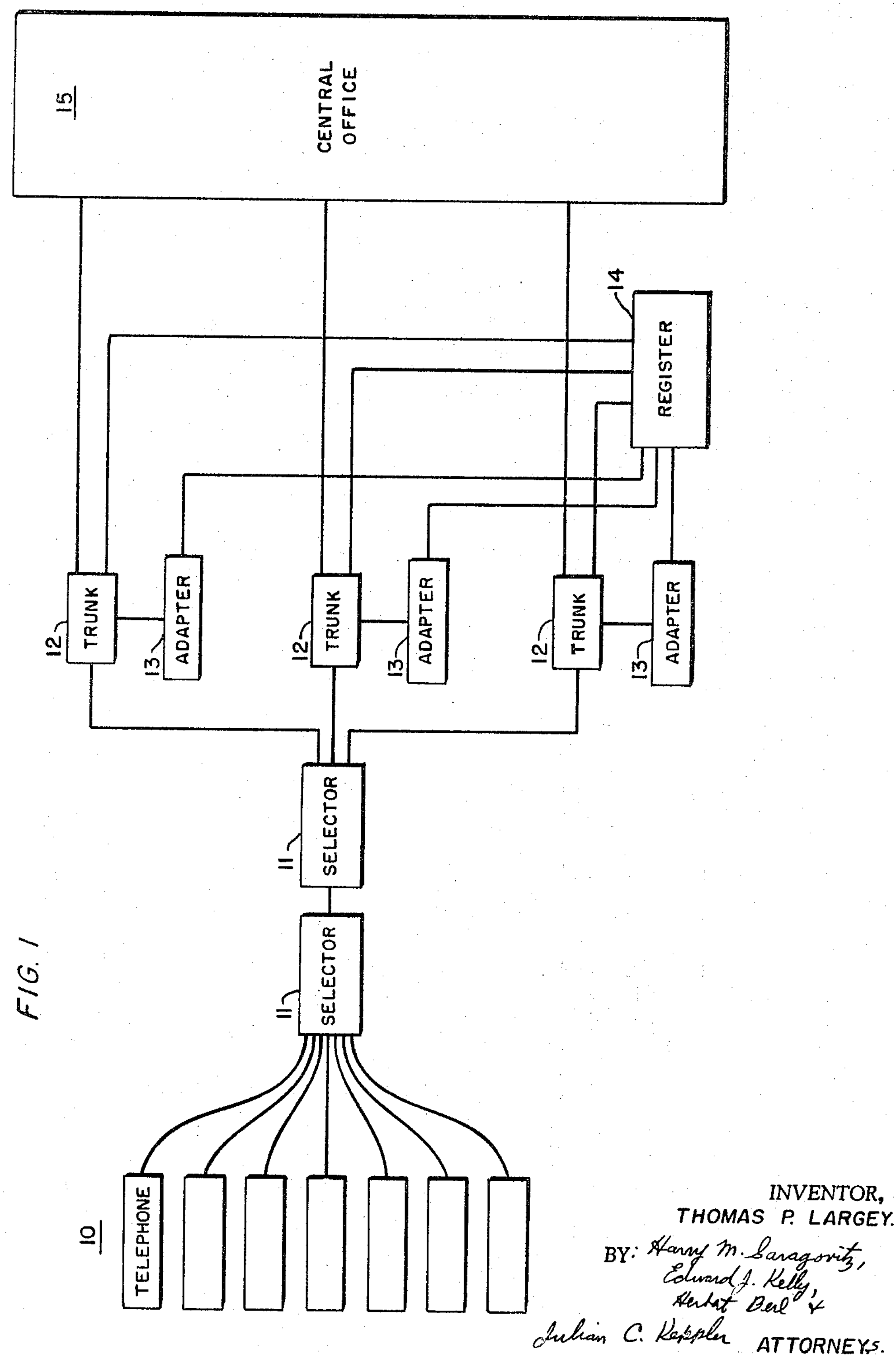

The invention described herein may be manufactured and used by or for the Government for governmental purposes without the payment of any royalty thereon.

The present invention relates in general to automatic telephone systems and more particularly, to a means for preventing unauthorized calls from telephones connected to a private automatic branch exchange (PABX).

Automatic telephone systems have been devised which incorporate restrictor circuits. The restrictor circuit, which may be located at a PABX, will usually observe the first three dialed digits of all outgoing calls to determine if the call is either authorized or unauthorized; for example, "local" or "long-distance." If the first three digits dialed represent a local call, the restrictor will pass the call, release itself, and be available to observe a subsequent call. If, however, the call is long distance, or restricted for some other reason, the restrictor will disconnect the telephone from the central office at a main exchange before releasing itself. The telephone, in this case, may still be connected to the trunk which will send back a busy signal or some other indication that the call is restricted. The restrictor in such systems is seized when the calling telephone at the PABX seizes an outgoing trunk to the main exchange. Such a system is not entirely reliable as may be seen from the following example:

A subscriber at the PABX may first make an authorized call and be passed by the restrictor. The restrictor will release itself at this time so as to be available for use with subsequent calls on other trunks. After the subscriber has completed his authorized call, he is usually disconnected from the central office of the main exchange when he replaces the handset on the telephone hook. However, if the subscriber after completing the authorized call should not replace the handset and then wait a short time (usually about 20 seconds) after the called party has hung up, the central office will release itself from and then reseize the trunk after which a dial tone will be sent back. Of course, since the central office of the main exchange has now reseized the outgoing trunk which has remained connected to the subscriber's telephone, the restrictor equipment, which has released itself previously, will not be reseized to observe the first three digits dialed. This is true because the restrictor is seized only when the outgoing trunk is seized by the subscriber's telephone. The subscriber may now dial any number desired without being observed by the restrictor.

It is, therefore, the object of the present invention to provide simple, inexpensive circuitry which will initiate seizure of the restrictor in the PABX when the central office seizes the outgoing trunk regardless of whether the PABX subscriber has hung up or not before initiating a second call.

In accordance with the present invention means are provided for connecting a restrictor to an outgoing trunk in response to seizure of said trunk by the central office rather than in response to seizure of said trunk by the subscriber's telephone.

Figure 2:
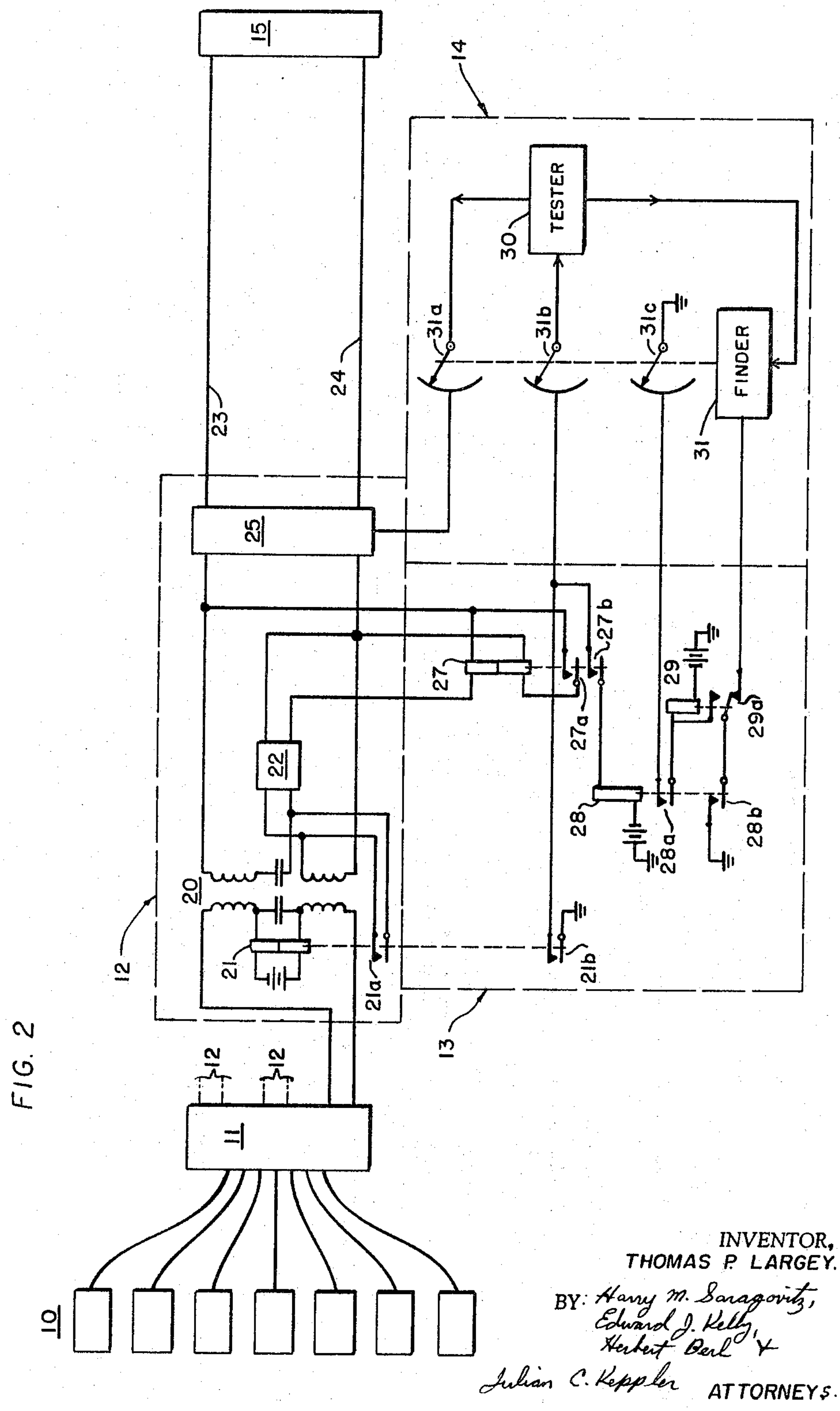

Other objects and features of the invention will become apparent to those skilled in the art as the disclosure is made in the following description of a preferred embodiment of the invention as illustrated in the accompanying sheets of drawing, and wherein:

FIG. 1 is a block diagram of the system incorporating the present invention; and FIG. 2 is a detailed circuit diagram of a preferred embodiment.

Referring now to the drawings there is shown in FIG. 1 a series of telephones 10 of a typical PABX connected through a series of selectors 11 to a plurality of trunks 12. Connected to each trunk 12 is a restrictor comprising trunk adapter 13 and a register 14. All trunks 12 are connected to the central office 15. This system generally operates as follows: One of the telephones is removed from the hook and seizes a selector 11 which returns a dial tone to the telephone. If the subscriber wishes to be connected to the central office, a code is dialed which is sensed by the selectors 11. For example, if the required code for connection to the central office is "9–2," the first selector 11 will connect the telephone to the second selector 11 after dialing "9." Upon dialing "2" the second selector will connect the telephone to one of the trunks 12. When the central office 15 finds the particular trunk 12, which is requesting service the trunk 12 will be automatically connected by the trunk adapter 13 to the register 14 and dial tone will be returned by the central office 15 to the telephone 10. As the subscriber dials the first three digits register 14 will observe these digits and determine if the call is a restricted call. If the call is restricted, the register will disconnect the trunk 12 from the central office 15 and return a signal, usually a busy tone, to the telephone 10. The register 14 will also disconnect itself from the trunk 12 and the trunk 13 so as to be ready to observe the next subscriber. If the call is not a restricted call, the register 14 simply disconnects itself from the trunk 12 and the trunk adapter 13 but does not disconnect the trunk 12 from the central office 15. It is to be noted here that after the trunk 12 seizes the central office 15 there is always some DC potential on the trunk lines. The polarity of this potential is reversed several times during the cycle; for example, when the central office 15 finds the trunk 12, when the called party answers, and when the called party hangs up. Now, after the called party hangs up, the equipment in the central office 15 will remain under the control of the calling party at telephone 10 for a short period, usually about twenty seconds. After this period, the equipment in the central office 15 will release itself automatically and the potential will be removed competely from the trunk 12, assuming the calling party has not hung up yet. The trunk 12 will detect this removal of the potential and send back to the central office 15 a reversed potential to reseize the central office 15 which in turn will return a dial tone to the telephone 10. The absence of the potential from the line will be detected by the trunk adapter 13 which will now reset itself and be ready to reseize the register 14 when the trunk 12 is seized by the central office 15. The above described cycle for the register will now be repeated. It can, therefore, be seen that the register 14 will be seized when the central office 15 seizes the trunk 12 even while the calling party maintains seizure of trunk 12.

FIG. 2 shows a detailed circuit of the system shown in FIG. 1. The trunk 12 comprises a repeat coil 20 having a relay 21 connected on one side and associated contacts 21*a* connected to the other side. Connected across contacts 21*a* is the typical automatic supervisory control network 22 the output of which is connected to the tip and ring lines 23 and 24 respectively leading to the central office 15. One output line of network 22 is connected to the tip line 23 through relay 27. Also connected across the lines 23 and 24 is a busy tone generator 25.

The trunk adapter 13 includes a pair of contacts 21*b* one side of which is grounded. A slow-to-release double coil relay 27 has one coil connected across lines 23 and 24 through its own contact 27*a* and the other coil connected to the line 23 and one output of network 22. One side of contacts 27*b* is connected to contact 21*b* with the other side connected to one side of a slow-to-release relay 28. Relay 28 on the other side is connected to a battery and operates associated contacts 28*a* and 28*b*. One side of contacts 28*a* is connected to one side of relay 29 the other side of which is connected to battery. Relay 29 operates associated transfer contacts 29*a*.

The register 14 comprises a tester circuit 30 and a line finder 31. Line finder 31 operates a ganged stepping switch having contacts 31*a*, 31*b*, and 31*c*. Contacts 31*a* are connected between the tester circuit 30 and each of the generators 25 of each trunk 12. Contacts 31*b* are connected bewteen contacts 21*b* of each of the trunk adapters 13 and the tester 30. Contacts 31*c* are connected between ground and contact 28*a* of each of the trunk adapters 13.

A complete cycle of operation will now be described. A subscriber at telephone 10 after dialing the correct code is transferred to an outgoing trunk 12. A switch in the telephone 10 or in the selector 11 is now closed completing a circuit through relay 21. Relay 21 operates contacts 21*a* and 21*b*. Contacts 21*a* when closed completes the ring side of the line circuit 23 through the repeat coil 20. Contacts 21*a* also completes a circuit to the supervisory network 22 which applies a DC potential through relay 27 and across lines 23 and 24 to signal the central office 15 that service is requested. The central office 15 now proceeds to find trunk 12 and will apply a reverse potential to lines 23 and 24 thereby causing current flow over lines 23 and 24 to signal circuit 22 that the trunk 12 has been found. Network 22 and relay 27 will now draw current. Network 22 will now remove its voltage from lines 23 and 24 leaving the reversed voltage returned from the central office 15 on the lines 23 and 24. Contacts 27*a* are now closed and the voltage on lines 23 and 24 will now maintain relay 27 operated. These contacts, 27*a* and 27*b* will remain closed as long as there is a voltage on lines 23 and 24. Because of the slow-to-release feature of relay 27, contacts 27*a* and 27*b* will not open when the voltage on lines 23 and 24 is quickly reversed. Contacts 21*b* are also in the closed position at this time and ground is now applied to relay 28 and to contacts 31*b*. Relay 28 being operated closes contacts 28*a* and 28*b*, the former preparing a circuit to relay 29 and applying a voltage to contacts 31*c* and the latter applying ground to the finder 31. The finder 31 will now operate to step contacts 31*a*, 31*b*, and 31*c*. The armature of contacts 31*c* will eventually contact the line associated with the present trunk and apply ground thereto. At this time current will flow through relay 29 thereby breaking and making contacts 29*a*. Breaking contacts 29*a* will stop the finder 31 and then making contacts 29*a* maintains relay 29 operated.

The central office 15 will now be sending back dial tone over lines 23 and 24, through repeat coil 20, and to the telephone 10. The subscriber proceeds to dial, pulsing relay 21 and contacts 21*a* and 21*b*. Relay 28 will not be affected by these dialing pulses because of its slow-to-release feature. Contacts 21*a* when pulsed will open and close the ring line 24 sending dialing pulses to the central office 15. Also pulsed are contacts 21*b* which at this time are connected to tester 30 through contacts 31*b*. The tester will observe these pulses and determine if the call is authorized. If not authorized, a signal will be sent through contacts 31*a* to generator 25 which will disconnect the trunk and reutrn a busy tone back to telephone 10 through repeat coil 20. The tester will also send a signal to finder 31 to reset contacts 31*a*, 31*b*, and 31*c* to the initial condition so that the restrictor may be available for a subsequent call. The subscriber will now hang up releasing relay 21 and contacts 21*a* and 21*b* which will permit all other relays and the supervisory network 22 to be released and reset. Generator 25 will also be reset when the voltage on lines 23 and 24 is removed.

However, had the call been authorized no signal is sent to generator 25 by tester 30 and the finder 31 is simply reset. During the conversation relays 21, 27, 28, and 29 are all operated. A short time fater the call is completed and if the subscriber at telephone 10 has not hung up, the equipment in the central office 15 will automatically disconnect itself from the trunk 12 by removing the voltage applied to lines 23 and 24. With no voltage on lines 23 and 24 current flow will cease in relay 27 which will now restore. Relays 28 and 29 will also restore when contacts 27*b* and 28*b* respectively are opened. Network 22 will detect this removal of voltage from lines 23 and 24 and will operate to reapply a supervisory voltage to these lines. There will have been a considerable time period in which no voltage appeared on lines 23 and 24 which is sufficent to permit slow-to-release relays 27 and 28 to release. The central office will detect this reapplied voltage and start searching for trunk 12. When found, the central office will, as before, apply a reverse voltage to lines 23 and 24 causing current to flow through relay 27 and network 22. Relay 27 will operate causing relay 28 to operate and contacts 28*b* to close, thereby reseizing the finder 31 so that the tester 30 may now observe the first three digits if a new number is dialed.

What is claimed is:

1. An automatic telephone system comprising a private branch exchange having a plurality of subscriber telephones; a plurality of trunk means for connecting said telephones to a central office; selector means for selectively connecting one of said telephones to one of said trunks in response to a predetermined dial signal sent by said one of said telephones; blocking means in said trunk means for blocking calls to said central office upon energization of said blocking means; a register means for detecting dialing signals; each said trunk means having an associated control means connected thereto for connecting said register to said associated trunk in response to said associated trunk seizing said central office; means in said control means for transmitting dialing signals from said associated trunk means to said register means; said control means observing the dialing signals on every attempt to seize said central office; first means in said register means for disconnecting said register means from said trunk means upon detecting a predetermined number of said dial signals; and second means in said register means connected to said trunk means for energizing said blocking means upon detecting a predetermined dialing signal.

2. The device according to claim 1 and wherein said control means includes a relay means which in response to a DC current flow between said trunk and said central office energizes said control means for connecting said register to said associated trunk.

3. The device according to claim 2 and wherein said register includes a bank of stepping switches operated by energization of a finder, said relay means energizing said finder upon detection of a DC current flow between said central office and said trunk and deenergizing said finder when said stepping switches are connected to said energized control means.

References Cited

UNITED STATES PATENTS

| | | | |
|---|---|---|---|
| 2,886,646 | 5/1959 | Nilsson et al. | 179—18.19 |
| 2,916,555 | 12/1959 | Gatzert | 179—27.021 |
| 3,055,984 | 9/1962 | Smith | 179—27.021 |

KATHLEEN H. CLAFFY, *Primary Examiner.*

L. A. WRIGHT, *Assistant Examiner.*